United States Patent [19]

Corby, Jr. et al.

[11] Patent Number: 5,550,758

[45] Date of Patent: Aug. 27, 1996

[54] AUGMENTED REALITY MAINTENANCE SYSTEM WITH FLIGHT PLANNER

[75] Inventors: Nelson R. Corby, Jr.; Peter M. Meenan, both of Scotia, N.Y.; Claude H. Solanas, III, Morgan Hill; David C. Vickerman, Pleasanton, both of Calif.

[73] Assignee: General Electric Company, Schenectady, N.Y.

[21] Appl. No.: 219,558

[22] Filed: Mar. 29, 1994

[51] Int. Cl.$^6$ .................................................. G06F 15/50
[52] U.S. Cl. .................. 364/571.03; 364/424.01; 364/432
[58] Field of Search ............... 364/571.03, 424.01, 364/424.02, 402, 433, 516, 525, 551.01, 559, 570, 571.4, 578; 395/94, 97, 907, 930; 367/6, 48, 907, 134; 358/103, 108

[56] References Cited

U.S. PATENT DOCUMENTS

| | | | |
|---|---|---|---|
| 4,868,771 | 9/1989 | Quick et al. | 364/578 |
| 5,047,990 | 9/1991 | Gafos et al. | 367/6 |
| 5,155,683 | 10/1992 | Rahim | 364/424.02 |
| 5,182,641 | 1/1993 | Diner et al. | 358/103 |
| 5,307,271 | 4/1994 | Everett, Jr. et al. | 364/424.02 |
| 5,412,569 | 5/1995 | Corby, Jr. et al. | 364/424.01 |

FOREIGN PATENT DOCUMENTS 80100946 6/1994 Taiwan .

OTHER PUBLICATIONS

"Development of a Graphical Interface for Robotic Operation in a Hazardous Environment", D. N. Rocheleau and C. D. Crane III, Center for Intelligent Machines and Robotics, vol. 2, pp. 1077–1081, Oct. 1991, Charlottesville, VA.

"Kinematic Control and Visual Display of Redundant Teleoperators", H. Das, T. B. Sheridan & J. E. Slotine, Massachusetts Institute of Technology, vol. 3, pp. 1072–1077, Nov. 1989, Cambridge, MA.

Primary Examiner—James P. Trammell
Attorney, Agent, or Firm—Lawrence P. Zale; Marvin Snyder

[57] ABSTRACT

An enhanced reality maintenance system for operating in a hazardous or inaccessible environment employs an environment modeler which is supplied with spatial parameters of a given environment and creates a computer model of the environment. An environment renderer creates a plurality of images, each corresponding to a viewing location and orientation, 'viewpoint'. A remotely operated vehicle (ROV) attached to a base unit by a tether cord or radio link navigates in the environment. The ROV has a spatial imaging device, such as a video camera, and actuators which propel it through the environment. Its position and orientation are determined by a position and attitude (P&A) sensing unit, and are passed to an ROV renderer which creates an image of a prestored model of the ROV having the same location and orientation as the ROV and viewed from a specified viewpoint. The viewpoints may be predetermined, provided to the system or may be interactively determined as an offset from the ROV position and orientation. Alternative embodiments include an image archive and comparison unit capable of storing images linked to information of the image acquisition, retrieving stored images with the image acquisition into and transforming one of the images to match the image acquisition information of the other image.

5 Claims, 3 Drawing Sheets

AUGMENTED REALITY MAINTENANCE SYSTEM WITH FLIGHT PLANNER

CROSS-REFERENCE TO RELATED APPLICATIONS

Related to U.S. patent applications "Augmented Reality Maintenance System" U.S. Ser. No. 08/219,565 filed Mar. 29, 1994 and "Augmented Reality Maintenance System with Archive and Comparison Device" U.S. Ser. No. 08/219,562, filed Mar. 29, 1994 U.S. Pat. No. 5,412,569 by Nelson R. Corby, Jr., Peter M. Meenan, Claude H. Solanas, David C. Vickerman, Christopher A. Nails; and "Augmented Reality Maintenance System Employing Robotics Arm" U.S. Ser. No. 08/219,561, filed Mar. 29, 1994 by Claude H. Solanas, Nelson R. Corby, Jr., Peter M. Meenan, David C. Vickerman, all filed with this application and all assigned to the present assignee.

BACKGROUND OF THE INVENTION

1. Field of the Invention

The present invention relates to a remotely operated vehicles and more specifically to computer enhanced environment visualization of a remotely operated vehicle.

2. Description of Related Art

Typically there is a need for inspection of machines or structures which are in environments which are inaccessible or very hazardous for humans. Several such environments would be inside a nuclear reactor boiler, deep beneath the sea, in a forest fire, in an oil well or in an area contaminated with a poisonous gas. The high temperatures, radiation exposure, high pressure, or toxic effects of these environments are clearly dangerous for humans. The space requirements to examine an in-line pump within an oil well or other environments with limited space also preclude humans access.

Typically these machines and structures within these environments have been inspected or repaired by remotely operated vehicles (ROV). These ROVs may be attached to a control unit some distance away by a tether cord or may be run by radio signals from a control unit at a safe distance away. The ROVs typically have a method of sensing their environment, with a testing or imaging device, such as a video camera. ROVs also employ a means of propelling themselves around their environment. In a fluid, like water, it may be a number of propellers driven by electric motors.

The use of ROVs also typically require a method of determining the position and orientation of the ROV (and/or its subparts) with respect to the operating environment allowing it to successfully move the ROV through the inspection environment. An example of a position sensing system employs SONAR operating through the water of the nuclear reactor boiler. Conventional systems require complicated compensation schemes and frequent recalibration to offset the errors due to variations or noise in the environment. For example, the time of flight of a SONAR signal depends on the temperature of the water through which the SONAR pulse travels. Temperature gradients within the pressure vessel must be carefully mapped and monitored to allow accurate position determination.

Typically the ROV will carry a number of inspection sensors. Typical sensors include underwater TV cameras, ultrasound flaw detection transducers, thermal imagers and point probes, such as microphones.

The major problem in the use of ROVs for inspection and repair in these remote environments is the difficulty of accurately positioning the ROV at desired locations within a complicated environment and then verifying that position and orientation, and passing the position and orientation to persons analyzing data from the ROV or other support personnel.

Another problem occurs as the ROV is moved from one site to another manually within the environment. In this situation, it is difficult to accurately determine the ROV's position at a given instant. Since one of the sensors typically carried is an underwater TV camera, the operator will often try to use the video from the camera to determine the exact position and orientation of the ROV, especially when the camera is not facing in the direction the ROV is moving. Typically the operator will zoom the camera back to wide angle and may move the ROV further away from a particular feature in an attempt to determine where in the environment he actually is. This task is made easier to the extent the position and orientation sensing system is accurate and reliable. Often, the P&A systems are not very accurate and it may take a long time to accurately position the ROV for inspection or repair.

ROVs are typically used in determining cracks and fractures inside environments, such nuclear reactor boilers. Several problems arise using ROVs and nuclear reactor boilers. One problem is that irregularities need to be monitored over a period of time (on the order of years) to determine the rate of deterioration. Presently this is accomplished by moving an ROV to a particular position and videotaping the structure or device which is to be examined. At a later date the ROV is positioned at the same site and current data (such as a video image) is compared to previous data. Since it is very difficult to position the ROV at exactly the same site and orientation in three dimensions and obtain a video image from exactly the same viewpoint as previous times, it is difficult to determine differences between images. This tends to be a very subjective determination being made by the operator. The actual cost of maintenance of a nuclear power facility is not only related to the cost of inspection, but is also due to the time that the plant is off-line. This typically can be many times the actual cost of maintenance. It is therefore beneficial to complete inspection and repair in a minimum time period.

A related problem that affects the speed and accuracy of the inspection has to do with the difficulty of retrieving all pertinent past data. If an operator is reinspecting a given location in the reactor, he needs all past information that relates to that site. This may consist of still imagery, segments of past videotapes of a site, auxiliary sensor data such as ultrasound and thermal images as well as non-image data such as written reports and observations or perhaps audio tape recordings of sounds at the site. If this background information is scattered over many physical locations and is recorded or stored on many types of media, (paper, photos, handwritten notes, audio tapes, magnetic video tapes or discs etc) it becomes very difficult to rapidly make inspection decisions.

Another problem which arises in inspecting or examining structures with an ROV is that of planning the actual trajectory of the ROV needed to move it from one site to the next. The environment typically has objects which the ROV must avoid when traveling from one point to another. Currently, an operator examines environment blueprints, and with his knowledge of the ROV size and shape, maneuvers the ROV through the environment. It is very difficult to visualize the full complexity of the 3D environment and whether a given pathway actually will allow passage of the real ROV. Since control of the ROV is complex and demanding, it becomes a very difficult task for the operator to "size up" the suitability of a given approaching pathway while trying to physically control the progress of the ROV.

Currently, there is a need for a system which can provide efficient remote inspection and repair in inaccessible or hazardous environments.

SUMMARY OF THE INVENTION

A remote maintenance system employs an environment modeler for receiving parameters defining objects in a hazardous or inaccessible environment. The environment modeler produces a computer generated model of the environment.

A remotely operated vehicle (ROV) carrying a sensor package, for imaging and performing tests on structures in the environment, and actuators, capable of maneuvering the ROV, is placed in the environment.

A position and attitude (P&A) sensing unit senses the position and orientation of the ROV relative to the environment.

A viewpoint for rendering a computed view of the environment is determined by the operator (either by inputting viewpoint coordinates or by selecting from a pre-established list of viewpoint coordinates) and provided to an environment renderer which generates an image corresponding to the shapes defined by the environment geometry when viewed from the selected viewpoint.

The position and orientation of the ROV is provided to the environment renderer along with offsets which define the position and orientation of the sensors with respect to the ROV. The resultant viewpoint, (formed by combining the position and orientation of the ROV and an offset displacement of the sensors) will allow the environment renderer to produce images corresponding to views of the environment as "seen" from the viewpoint of the sensor package. The imagery produced by the environment renderer will vary in real-time according to the position and orientation of the ROV.

Similarly, position and orientation of the ROV is provided to an ROV renderer (along with operator indicated viewpoint). The ROV renderer generates an image of the ROV as seen from the same viewpoint used by the environment renderer.

A video mixer superimposes the image of the ROV on the image of the environment and displays the superimposed images on a monitor, thereby allowing an operator to visualize the position of the ROV relative to its environment.

Several viewpoints and superimposed images may be produced simultaneously to provide multiple views of the ROV in the environment.

In an alternate embodiment, sensory data from the ROV sensor package is stored along with auxiliary information such as the spatial location of the sensors and parameters employed in acquiring the sensor data and sensor images. Any of these past images or past sensor data may later be recalled and transformed (if necessary) so as to correspond to the current position and orientation of the ROV and its sensors. Digital signal processing techniques may then be performed to determine the rate of corrosion or rate of crack growth over time, a very important parameter for nuclear reactor maintenance. In addition, a signal processor and visualization unit allows current or past imagery from other modalities such as ultrasound scans, to be merged with current or past video imagery. Pertinent data, such as past inspection results and operator observations, are also extracted from the inspection database automatically and displayed for operator consideration.

In another alternate embodiment, a pointing device is provided for the operator to select a trajectory, being a time-ordered sequence of locations to be visited by the ROV. Environment geometry, ROV geometry and the inspection itinerary, are provided to a path execution unit to cause ROV actuators to move ROV according to the desired trajectory.

OBJECTS OF THE INVENTION

It is an object of the present invention to provide a system for visualizing the position and orientation of a remotely operated vehicle within a specified environment.

It is another object of the present invention to provide a remotely operated vehicle which automatically navigates through a hazardous environment crowded with objects.

BRIEF DESCRIPTION OF THE DRAWING

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE INVENTION

Figure 1:
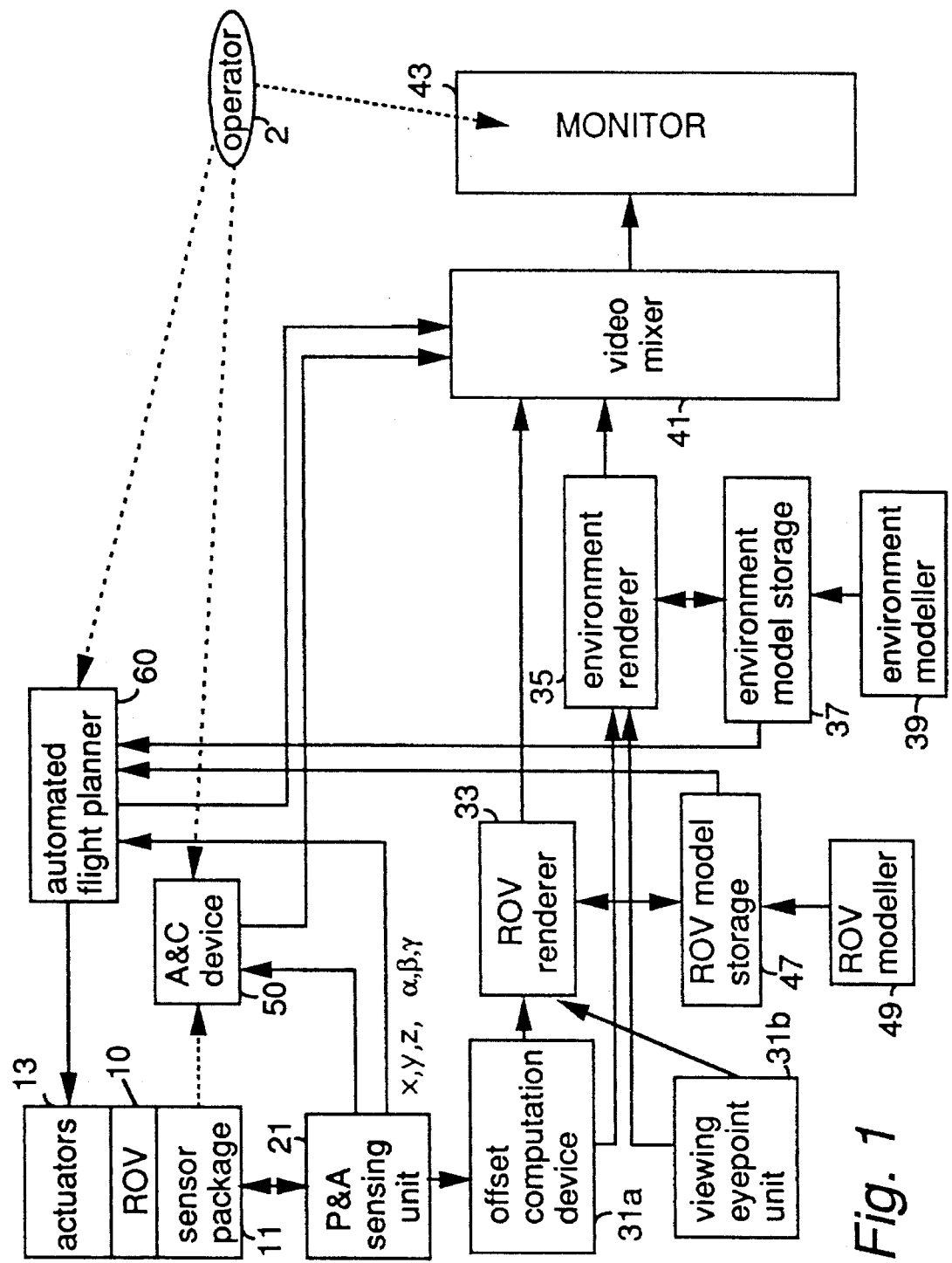
FIG. 1 is a simplified block diagram of an enhanced reality system according to the present invention.

FIG. 1 is a simplified block diagram of the major components of an augmented reality maintenance system according to the present invention.

Parameters defining an environment, such as blueprint measurements, position and shape measurements, and material types may be manually provided to an environment modeler 39. These parameters may also be automatically provided by automated spatial measurement from ultrasound or laser distance measurement devices. Environment modeler 39 constructs a computer model from the parameters it receives which may be rapidly manipulated in near-real-time. The model is stored in environment model storage device 37.

Parameters defining the geometry of the ROV are provided to an ROV modeler 49. ROV modeler 49 constructs a computer model from the parameters it receives. The model of the ROV is stored in ROV model storage device 47.

An environment renderer 35 has the capability of accessing the model in environment model storage device 37, and displaying it as viewed from any location and orientation, known as a 'viewpoint'. It also has the capability of creating several displays of the model viewed from several different viewpoints simultaneously.

A remotely operated vehicle (ROV) 10, attached by tether cord, or a radio link to a base unit, is intended to be placed in a hazardous or inaccessible environment and employs a plurality of actuators 13 which propel the ROV through the medium of the environment. In a nuclear reactor boiler, filled with water, the actuators are electric motors attached to propellers. These may move the ROV in a number of directions and rotate it in any orientation. In a terrestrial environment, the actuators are motor driven wheels, tracks or belts.

A sensor package 11 is attached to the ROV. This acquires information about desired structures or devices. Spatial imaging device, in its most common form is a video camera, acquires information such crack and corrosion in a wall of a nuclear reactor boiler, for example. Sensor package 11 may also be an ultrasound device capable of detecting irregularities in a structure or device, or any such modality used in structure examination. Sensor package 11 could also be a point measurement probe such as a microphone or accelerometer to measure vibrations. Also, more that one sensor could be operating at any time.

A position and attitude sensing (P&A) unit 21 determines an approximate location and orientation of the ROV. This may be, for example, SONAR sound sources, dispersed at known locations around the environment which successively emit a signal. Multiple sensors on the ROV at known locations sense the signal from the SONAR sources. A receiver attached to the sensors determines the location (x,y,z) and orientation ($\alpha$, $\beta$, $\gamma$) of the ROV based upon differences in the time of reception of the signal by each sensor.

The position (x,y,z) and orientation ($\alpha$, $\beta$, $\gamma$) determined by P&A sensing unit 21 is provided to an ROV renderer 33. ROV renderer 33 creates an image of a prestored model of the ROV from model storage device 47, at location (x,y,z) and orientation ($\alpha$, $\beta$, $\gamma$) as viewed from an viewpoint provided to it. ROV renderer 33 has the capability of creating several images of the ROV model viewed from several different viewpoints simultaneously. The position and orientation of the ROV, produced by P&A sensing unit 21, are supplied to offset computation device 31a. This device calculates an new viewpoint which is offset from the origin of the ROV model. This is used to define viewpoints corresponding to the sensors carried by the ROV.

The environment renderer 35 produces a number of images of the environment corresponding to viewpoints supplied to it. In FIG. 1, two viewpoints are supplied—one from the viewing viewpoint unit 31b and another from the offset computation device 31a. The environment renderer 35 produces two image signals, one showing the environment viewed from a set viewpoint and a second showing the environment as seen from the viewpoint of the selected sensor travelling with the ROV.

The viewpoint provided to ROV renderer 33 and environment renderer 35 may be predetermined values which have been typed into, or are resident in, viewpoint unit 31b.

The images pertaining to the same viewpoint from ROV renderer 35 and environment renderer 45 are provided to a video mixer 41. In the embodiment shown in FIG. 1, two viewpoints are employed, with two images produced by environment renderer 35 and one by the ROV renderer 33. The ROV image and the environment image for a single viewpoint are provided to a video mixer, to superimpose the ROV image on the environment image resulting in a superimposed image showing the relative position of the ROV model in the simulated environment, which corresponds to the actual position of the ROV relative to the actual environment. Video mixer 41 receives images from environment renderer 35, the ROV renderer 33 and the sensor package 11 carried by the ROV 10. Video mixer 41 produces an image for monitor 43 for viewing by operator 2. The image produced on monitor 43 may consist of a number of sub-images comprising the main image. One such sub-image is the result of merging the image of the environment produced by the environment renderer 35 with the image of the ROV produced by the ROV renderer 33. The viewpoint for both renderers is the same and is supplied by viewpoint unit 31b. The second sub-image may be a view of the environment as seen from the point of view of the sensor package 11 travelling with the ROV 10. The third sub-image appearing on monitor 43 is an image produced by the sensor package 11 carried by ROV 10.

in alternative embodiments, more or fewer viewpoints, images may be used to create more or fewer superimposed images. Also, in another alternative embodiment, an operator may select or change the viewpoints and the offsets during operation.

Figure 2:
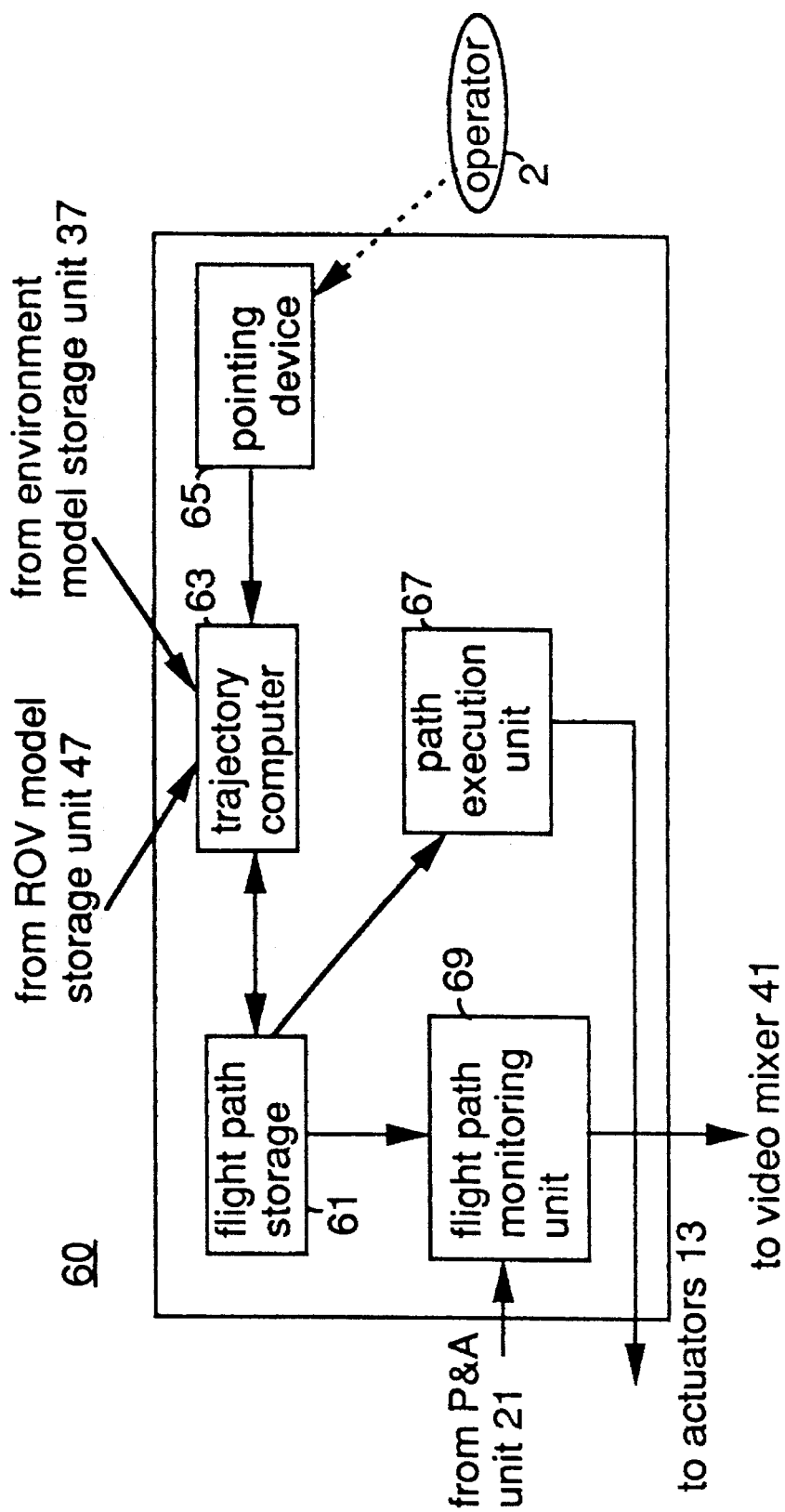
FIG. 2 is a more detailed block diagram of automated flight planner of FIG. 1.

In another embodiment, the present invention further employs an automated flight planner 60 which is coupled to environment model storage device 37, ROV model storage device 47 and actuators 13. FIG. 2 is a more detailed block diagram of automated flight planner 60 of FIG. 1. In FIG. 2, automated flight planner 60 is composed of an pointing device 65, a flight path storage device 61 for storing intended paths, or trajectories, of ROV 10, a path execution unit 67 and a trajectory computer 63. Pointing device 65 is used by operator 2 to choose destination locations in the environment which the ROV is to visit, which are provided to trajectory computer 63. Trajectory computer will then read information from ROV model storage unit 47 and environment model storage unit 37 and calculate a trajectory to the destination point which would not cause a collision with any objects in the environment. The computed trajectory may then be displayed to the operator on monitor 43 via video mixer 41 of FIG. 1. Operator 2 may also define destination points by typing symbolic names, or numerical locations into pointing device 65. Operator 2 may determine that the trajectory is acceptable and cause path execution unit 67 to execute the trajectory. Path execution unit 67 drives actuator 13 (FIG. 1) to move the ROV according to the calculated trajectory. Thus, the current calculated trajectory (or one selected from flight store device 61) can be executed by the actual ROV within the actual environment upon command by operator 2. Optionally, a flight path monitoring unit 69 reads the selected trajectory from path storage device 61, and receives the current position and orientation of the ROV, and indicates on monitor 43, via video mixer 41, the selected trajectory and the current path followed by the ROV.

Operator 2 may indicate not only destination points, but intermediate points of the trajectory. The trajectory computer determines a trajectory or appropriate path nearest the points indicated by operator 2 which will not cause a collision.

Since rapid, accurate determination of irregularities is very important in many cases, such as in off-line maintenance of a nuclear power plant, and costs are related to the length of time the plant is off-line, it is important to collect, retrieve and compare image data rapidly. In conventional systems, video images are acquired of suspect sites of a structure. At a later date, the ROV is directed manually to one of the suspect sites. A current video image is acquired, and the images are viewed side-by-side, usually in real-time, to determine the degree of deterioration. The comparisons are only valid when the archived image and the current image have the similar imaging parameters. Imaging parameters vary from one modality to another. For example, video cameras imaging parameters include the viewpoint, field-of-view, iris opening, zoom setting etc. By varying these parameters, the image becomes different.

The information from past inspections at a given site may take many forms such as photographs, video frames, video sequences on videotape, computer generated images which visualize data such as 2D ultrasonic inspection data, thermal imagery as well as inspectors reports and notes and non-image data e.g. audiotapes.

Figure 3:
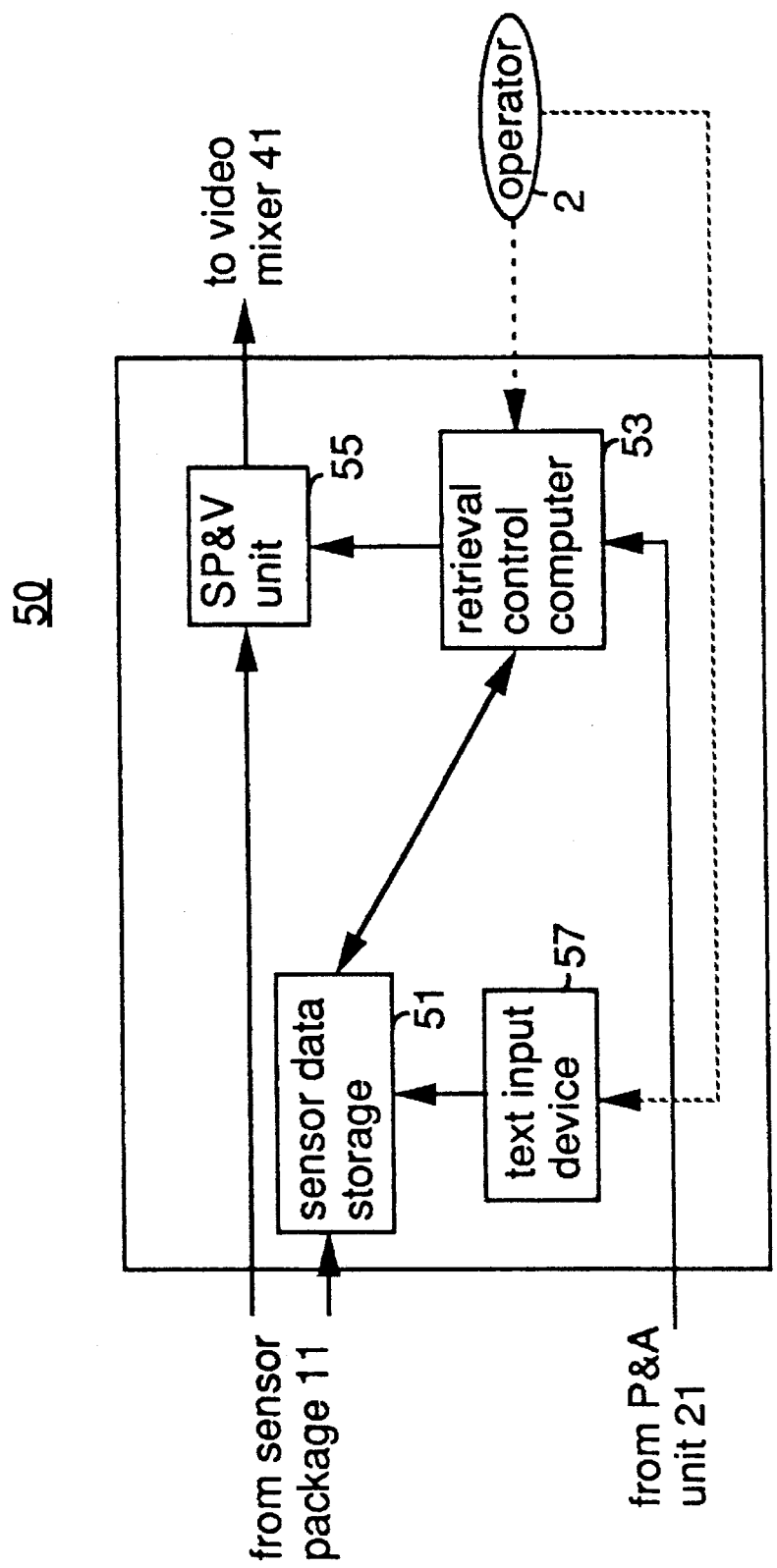
FIG. 3 is a more detailed block diagram of the archive and comparison (A&C) device of FIG. 1.

In another embodiment of the present invention, the invention comprising all of the previously described elements of FIG. 1, with automated flight planner 60 being optional, further comprises an archive and comparison (A&C) device 50. FIG. 3 is a more detailed block diagram of the A&C device of FIG. 1. In FIG. 3, A&C device 50 utilizes a sensor data storage device 51, capable of storing spatial imagery with location, orientation and acquisition parameters linked to each image. These parameters define the identity of the site imaged, when it was imaged, the viewpoint, the modality of the imager (visual, thermal, ultrasonic etc.) and description of values relating to the image (crack length, corrosion area etc.). In addition, storage device 51 provides storage for textual information such as inspectors reports and storage of non-image signal data such as recordings of microphones or accelerometers carried by the ROV. The textual data, and non-image signal data, also are linked to specific inspection sites and time stamped for identification at a later retrieval time. Much of the information provided to storage device 51 originates in sensor package 11 carried by the ROV 10. Textual information may be provided by a text input device 57.

A&C device 50 also includes a retrieval control computer 53, coupled to the data storage device 51, the P&A unit 21, the signal processing unit and visualization (SP&V) unit 55. Retrieval control computer 53, upon command by operator 2, retrieves all past data from storage device 51 which is pertinent to the site currently being examined and visited by the ROV. SP&V unit 55 receives sensor data from sensor package 11 and past inspection data from storage device 51 under control of the retrieval control computer 53. SP&V unit 55 transforms images archived in sensor data storage device 51, according to the position, orientation and imaging parameters, to match those of images currently being acquired by sensor package 11. The signals may then be placed on the same basis for comparison. SP&V unit 55 may either display the two images to operator 2 via video mixer 41 on monitor 43 in a side-by-side format, superimpose them, display image differences or employ any appropriate image processing methods thus highlighting regions for special attention by operator 2. The differences may be highlighted by color coding, graphical display etc. SP&V unit 55 may also display its results of comparisons and image processing in any appropriate form for consideration by operator 2.

SP&V unit 55 may also operate on non-image signals, such as sound data, to cause two signals to have the same acquisition parameters, and perform comparisons and signal processing on the transformed signals.

Retrieval control computer 53 may select two archived images to compare against each other instead of one archived and one current image. SP&V unit 55 will transform, one image, the other image, or both, to have the same viewpoint and imaging parameters allowing them to be directly compared. A number of archived images for the same site acquired at different times, may be transformed by the SP&V unit 55, to compose a 'time-lapse' movie when they are played back a time-ordered sequence.

Many elements of the block diagram of FIG. 1 may be physically located in the ROV or in the base unit, making little difference where they are located, except that monitor 43 and pointing device 65 must be accessible to operator 2; and actuators 13 and sensor package 11 must be on the ROV.

While several presently preferred embodiments of the present novel invention have been described in detail herein, many modifications and variations will now become apparent to those skilled in the art. It is our intent therefore, to be limited only by the scope of the appending claims and not be the specific details and instrumentalities presented by way of explanation herein.

What we claim is:

1. A remote maintenance system for inspection and repair of structures in an environment comprising:
    a) a remotely operated vehicle (ROV) having
        1. a sensor package, capable of inspecting physical characteristics of said structures in environment, and
        2. actuators capable of maneuvering the ROV;
    b) a position and attitude (P&A) sensing unit for providing a position and orientation of the ROV;
    c) environmental model storage device capable of retaining computer graphic information regarding the environment of the ROV;
    d) environment modeler for receiving parameters defining objects in an environment of the ROV and producing a computer generated model of the environment and storing the model in the environment model storage device;
    e) environment renderer coupled to the environment model storage device for generating an image of the environment from the environment model as viewed from at least one viewpoint;
    f) ROV renderer coupled to the P&A sensing unit adapted for generating an image of the ROV at a position and orientation corresponding to that of the ROV, generated from a prestored model of the ROV as viewed from at least one viewpoint;
    g) monitor for displaying a video signal;
    h) video mixer coupled to the environment renderer and the ROV renderer for displaying the images on the monitor, thereby allowing an operator to visualize the position of the ROV relative to its environment; and
    i) an automated flight planner comprised of:
        i. a pointing device allowing the operator to select points on a path which the operator desires the ROV to follow;
        ii. a flight path storage unit capable of storing information defining a path through space; and
        iii. a trajectory computer coupled to the environment model storage device, the pointing device, the flight path storage unit, functionally coupled to the ROV renderer and the actuators, for approximating a path closest to the points selected by the operator which does not cause the ROV to collide with objects in the environment, being a selected trajectory, storing this trajectory in the flight path storage unit, and causing the ROV to follow the selected trajectory.

2. The remote maintenance system of claim 1 further comprising viewpoint unit coupled to the ROV renderer and the environment renderer which provides the viewpoint employed in image rendering.

3. The remote maintenance system of claim 1 further comprising offset computation device coupled to the P&A sensing unit which provides the viewpoint, being an offset to location and orientation of the ROV received from the P&A sensing unit, employed by the environment renderer and the ROV renderer in image rendering.

4. The remote maintenance system of claim 1 further comprising a path execution unit coupled to the P&A unit and the flight path storage unit and actuators for reading the selected trajectory from the flight path storage unit and causing the actuators to move the ROV along that path.

5. The remote maintenance system of claim 1 further comprising a flight path monitoring unit coupled to the flight path storage unit, the P&A unit and the video mixer, for reading the selected trajectory from the flight path storage unit, and monitoring the actual location and position of the ROV over time, indicating the ROV's actual path, and displaying the selected trajectory and the actual path of the ROV on the monitor.

* * * * *